(12) United States Patent
Narrow et al.

(10) Patent No.: US 8,955,862 B1
(45) Date of Patent: Feb. 17, 2015

(54) CYCLING CONTROL SYSTEM

(71) Applicant: MonoMano, Inc., West Palm Beach, FL (US)

(72) Inventors: David Narrow, Owings Mills, MD (US); Dominic Marino, West Palm Beach, FL (US); Sara Hutchinson, Rochester, NY (US); Martin Szeto, Rochester, NY (US); Travis Block, San Antonio, TX (US)

(73) Assignee: MonoMano, Inc., West Palm Beach, FL (US)

( * ) Notice: Subject to any disclaimer, the term of this patent is extended or adjusted under 35 U.S.C. 154(b) by 0 days.

(21) Appl. No.: 13/871,299

(22) Filed: Apr. 26, 2013

Related U.S. Application Data

(60) Provisional application No. 61/647,261, filed on May 15, 2012.

(51) Int. Cl.
*B62L 3/02* (2006.01)

(52) U.S. Cl.
CPC ........................................ *B62L 3/02* (2013.01)
USPC .......................................... 280/264; 74/551.1

(58) Field of Classification Search
USPC ................... 280/263, 264; 74/551.1
See application file for complete search history.

(56) References Cited

U.S. PATENT DOCUMENTS

| | | | |
|---|---|---|---|
| 3,289,493 A | 12/1966 | Church | |
| 4,750,754 A * | 6/1988 | Lennon | 280/261 |
| 4,878,397 A * | 11/1989 | Lennon | 74/551.1 |
| 4,951,525 A * | 8/1990 | Borromeo | 74/551.1 |
| D315,328 S | 3/1991 | Giard, Jr. | |
| 5,033,325 A * | 7/1991 | Giard, Jr. | 74/551.3 |
| 5,094,124 A * | 3/1992 | Stonehouse | 74/551.8 |
| 5,145,210 A * | 9/1992 | Lennon | 280/281.1 |
| 5,235,871 A * | 8/1993 | Yamazaki et al. | 74/551.8 |
| 5,476,019 A | 12/1995 | Cheever et al. | |
| 5,678,455 A | 10/1997 | Watarai | |
| 5,730,453 A * | 3/1998 | Owsen | 280/282 |
| 5,758,548 A * | 6/1998 | Smith | 74/551.1 |
| 5,791,671 A * | 8/1998 | Tang et al. | 280/264 |
| 6,907,952 B2 * | 6/2005 | Jones | 180/206.1 |
| D511,726 S | 11/2005 | LeMond et al. | |
| 7,143,662 B2 | 12/2006 | Hobson, Jr. | |
| 7,159,882 B2 * | 1/2007 | Buhrman | 280/263 |
| 7,753,386 B2 * | 7/2010 | Drymalski | 280/243 |
| 7,779,724 B2 | 8/2010 | Fujii | |
| 7,891,687 B2 * | 2/2011 | Schmider | 280/281.1 |
| 2004/0245742 A1 * | 12/2004 | Buhrman | 280/263 |
| 2008/0087131 A1 * | 4/2008 | Tetsuka | 74/502.2 |
| 2012/0272777 A1 | 11/2012 | Tolhurst | |
| 2013/0075996 A1 * | 3/2013 | Armbruster | 280/259 |

* cited by examiner

*Primary Examiner* — Joseph Rocca
*Assistant Examiner* — Gabriela C Craciun
(74) *Attorney, Agent, or Firm* — Phillips Lytle LLP; David L. Principe

(57) ABSTRACT

A cycling control system designed to facilitate the operation of all cycle functions with a single hand. The controls are intended to allow individuals with unilateral weakness to steer, shift gears, and brake on any bicycle or tricycle. The system includes a handlebar that either replaces or attaches to existing handlebars. The handlebar grip is located adjacent to the brake and gear controls such that the user may operate all functions without ever having to remove his or her hand from the controls.

12 Claims, 5 Drawing Sheets

CYCLING CONTROL SYSTEM

CROSS-REFERENCE TO RELATED APPLICATION

The present application claims priority benefit of U.S. Provisional Patent Application No. 61/647,261 filed May 15, 2012, which is incorporated herein by reference.

TECHNICAL FIELD

The present invention relates generally to the field of cycling, and more particularly to an improved cycling control system that provides for one-handed operation of a bicycle or tricycle.

BACKGROUND ART

The design of standard bicycles and tricycles does not permit individuals with limited functionality in one arm to participate in the activity. If an individual with unilateral weakness desires to participate in cycling, the individual would likely struggle with balance when steering, and may only be able to operate either the front brake and front gear derailleur, or the rear brake and the rear derailleur. This problem limits not only the functional utility of the cycle and safety of the rider, but also restricts the comfort for individuals with a physical disability.

A very large number of people in the United States have some sort of unilateral weakness that prevents them from participating in cycling. Among this population, many individuals with additional health issues may realize improved health benefits with regular exercise. This population requires some modification to the current design of cycling controls to allow for safe and effective operation of a cycle.

BRIEF SUMMARY OF THE INVENTION

With parenthetical reference to corresponding parts, portions or surfaces of the disclosed embodiment, merely for the purposes of illustration and not by way of limitation, the present invention provides a cycle having at least two axles. The cycle includes a frame (18). A steering post (5) is journaled to the frame (18). A saddle (10) is attached to the frame (18). A handlebar (1) is connected to the steering post (5). The handlebar (1) has a control section within reach of a rider's hand. At least one brake lever (11, 12) and at least two gear shifting mechanisms (14,15) are mounted adjacent to each other in the control section.

The cycle may comprise a brake lever (11, 12) that is connected to front and rear braking mechanisms.

The cycle may comprise a grip (23) disposed between the two gear shifting mechanisms (14). The cycle may further comprise a control section disposed to the side of the rider's body or a control section disposed above the rider's lap.

The cycle may comprise a control section that is part of a handlebar (1) having a loop.

The cycle may comprise a control section that is connected directly to the steering post (5).

The cycle may comprise a rear axle (9) with two wheels (8) journaled thereon or a front axle with two wheels (8) journaled thereon.

The invention may comprise a handlebar (1) mountable to a steering post (5). The handlebar (1) having a control section with a brake lever (11) and at least two gear shifting mechanisms (14) mounted adjacent to each other so that when one of the rider's hands grips the handlebar (1) in the control section both gear shifting mechanisms (14, 15) and the brake lever (11, 12) can be reached and operated by the rider's hand without removing the hand from contact with the handlebar (1).

In one aspect, the handlebar (1) may be fixed directly to the steering post (5).

In another aspect, the handlebar (1) may be fixed to an existing handlebar (3).

The handlebar (1) may also comprise a rod directly attached to the steering column. The rod is located on the side of a seat (10). In one embodiment the rod may be pushed or pulled to steer the cycle.

The invention may also comprise a system including a brake lever (11, 12) disposed on a control section. At least two gear shifting mechanisms (14, 15) are mounted on the control section adjacent to the brake lever (11, 12). A steering post (5) is connected to the control section.

In one aspect the at least two gear shifting mechanisms (14, 15) and the brake lever (11, 12) can be reached and operated by the rider's hand when the rider's hand is in contact with the control section.

The cycling control system may comprise a grip (23) disposed adjacent to the gear shifting mechanisms (14, 15) and the brake lever (11, 12). The grip (23) may be disposed between the gear shifting mechanisms (14, 15).

The cycling control system may further comprise a brake lever (11, 12) that controls the front and rear braking mechanisms.

The cycling control system may further comprise a rod mounted vertically on a tadpole tricycle. The control section may be mounted to an existing handlebar (3).

The cycling control system may further comprise at least one gear shifting mechanism controlling at least two derailleurs.

DETAILED DESCRIPTION OF THE PREFERRED EMBODIMENTS

Figure 1:
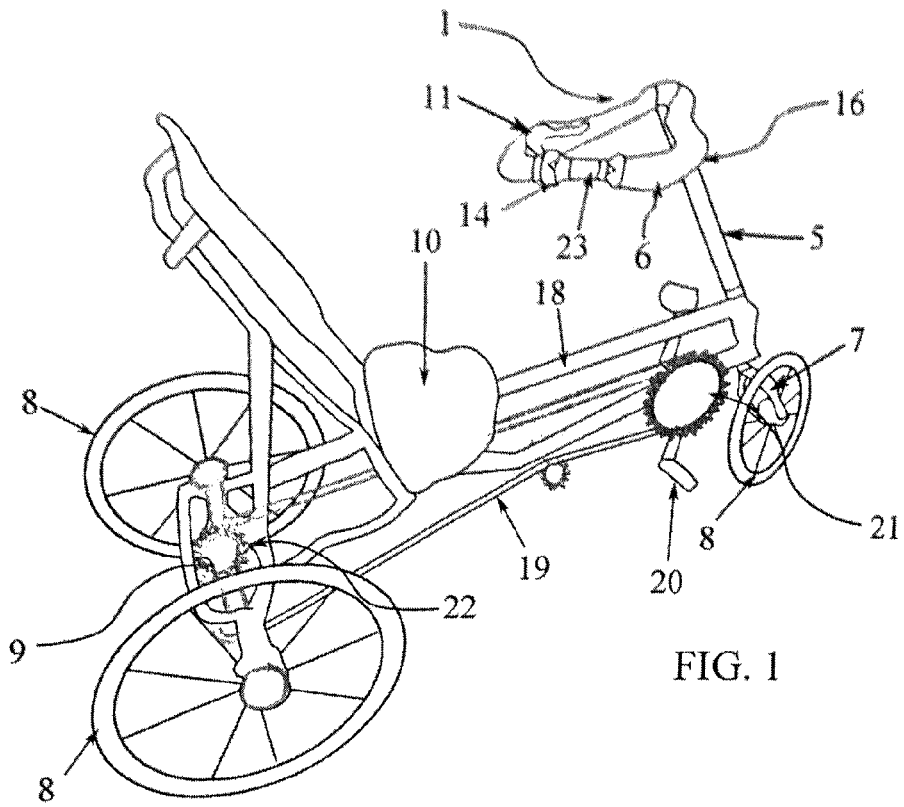
FIG. 1 is a perspective view of a recumbent tricycle including an embodiment of the cycling control system.
Figure 2:
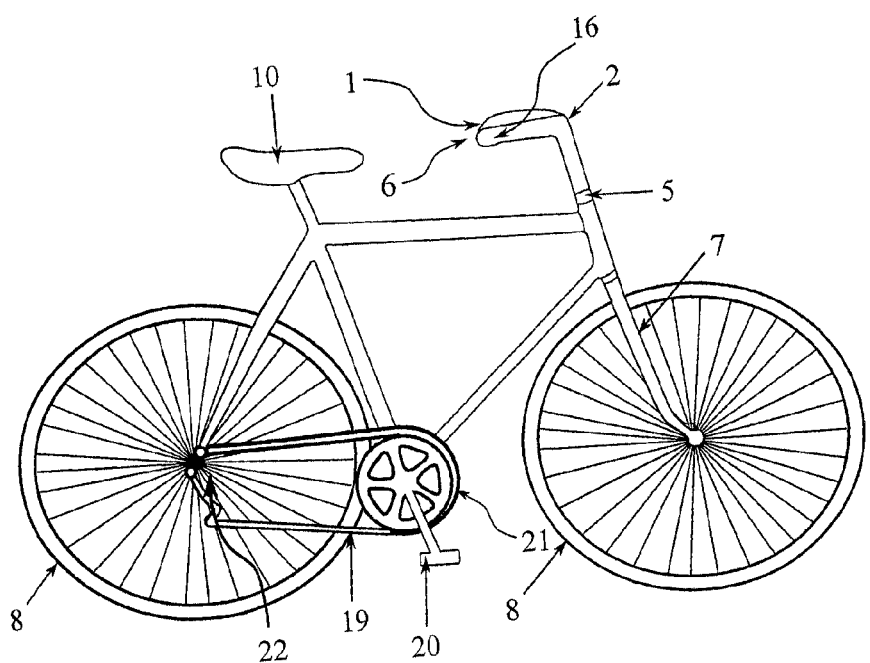
FIG. 2 is a side elevational view of a bicycle including an embodiment of the cycling control system.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 3:
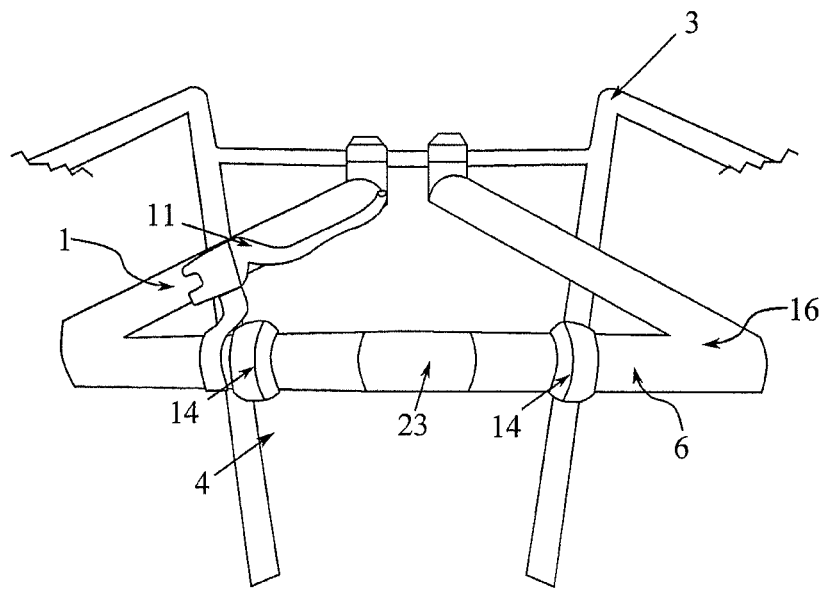
FIG. 3 is a perspective view of the handlebar of the cycling control system connected to existing handlebars.
Figure 4:
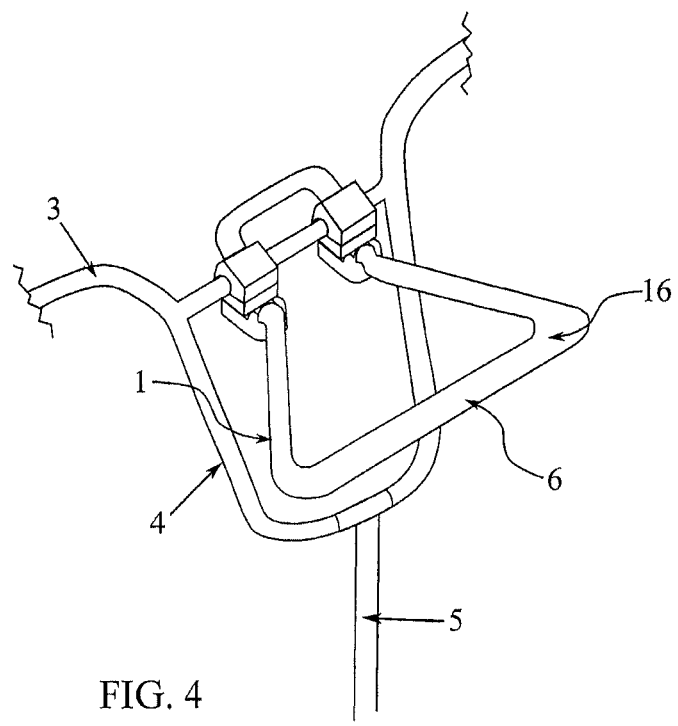
FIG. 4 is another perspective view of the handlebar of the cycling control system connected to existing handlebars.

Referring now to the drawings, and more particularly to FIG. 1 thereof, a cycle includes a control system 1 that may either replace the existing control system as shown in FIG. 1 or attach to existing handlebars 3 as shown in FIG. 3. The bicycle and the cycling control system are described in greater detail below.

The cycle itself may have any wheel orientation, and may be either a recumbent or upright cycle. In the embodiment shown in FIG. 1, the cycle is a recumbent tricycle. Examples of recumbent tricycles are shown in U.S. Pat. Nos. 7,354,055; 5,069,469 and 4,548,421; which are hereby incorporated by reference. The frame 18 of the tricycle is linear and runs from the center of the rear axle 9 forward to the front wheel fork 7. The front wheel controls steering and is operated by the steering handle 6 via a downstem 5 connected to the front of wheel fork 7. In the rear of the cycle, the linear frame connects to the rear axle 9 which has two wheels 8 powered by a chain 19 coupled to the pedals 20 near the front wheel 8.

Along the frame of the bike is a seat with a seatback 10 that can be positioned at any point along the frame. The positioning is only limited by the downstem 5 in the front of the bike and the rear axle 9 in the back of the bike.

The bicycle is powered by two pedals 20 that operate in the traditional manner. They are connected to a front gear cassette 21 and coupled to the rear gear cassette 22 and rear axle 9 via a chain drive. The gear ratio is controlled by derailleurs held in place by tension, and controlled by a gear shifting mechanism 14 on the handlebar.

The brakes are operated by a caliper braking system controlled by a lever 11 on the handlebar. When compressed, tension in the brake cable is increased and rubber pads squeeze the front and rear wheel simultaneously causing the bike to come to a stop. This lever can be connected to either the front or rear brake, or in the preferred embodiment, it connects to both brakes and activates them simultaneously upon depression. The position can be on either side of the shifters 14, and extends over the grip 23 for easy access.

The handlebar itself may be connected either directly to the downstem 5, or indirectly via clamps connecting the handlebar to the previous handlebar 3. All of the figures depict some aspect of the handlebar. Key functions of the handlebar include, but are not limited to, allowing the rider to adjust the position of the handle to a position of comfort and utility, to steer the cycle via a rotation of the front wheel about the axis of the downstem, to brake front and rear wheels with a single hand, and to shift gears on both the front and rear gear cassettes. A defining feature of the novel handlebar is that all functions described can be exercised with the use of a single hand, without ever having to remove the hand from the control system, thereby improving the safety of the cycle.

Figure 5:
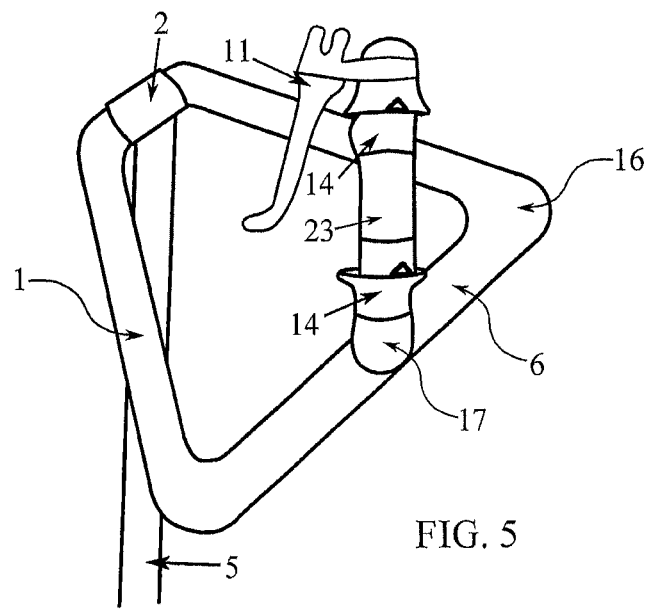
FIG. 5 is a perspective view of an alternate embodiment in which the grip is located on a vertical post extending from the handlebar where the grip would be present in other embodiments.

Turning to FIG. 3, a system has been designed in which a curved triangular handlebar 1 with curved corners 16 may be attached to the downstem 5, such that an apex of the triangle forms a junction with the downstem 5 and a linear portion 6 of the triangle faces the rider and is perpendicular to the frame of the bike when in the neutral position. On the linear portion 6 of the handlebar facing the rider are located a rubber grip 23 for comfort, two gear shifting mechanisms 14, and a brake lever 11 that operates both front and rear wheel brakes. The control section which may include the grip 23, the gear shifting mechanisms 14 and the brake lever 11 is shown oriented horizontally in FIG. 3 and is supported by the triangular handlebar 1. In FIG. 5, the control section is mounted vertically and supported by the triangular handlebar 1. This vertical control section shown in FIG. 5 may also be directly connected to the downstem 5 without support from the triangular handlebar 1, and may be linked via alternate mechanisms (e.g. a linear bar between the downstem connection 2 and the control section depicted in FIG. 5).

The controls are oriented such that when the rider rests his hand on the grip 23, he/she can operate the rear gear cassette 22 by squeezing the left side of his hand, or the front gear cassette 21 by squeezing the right side of his hand. The brake lever 11 is positioned such that the fulcrum is housed on the outside of either gear shifter with the lever 11 extending over the handle so that it can be easily reached by extending any fingers from the grip 23, and without having to remove the rider's hand from the grip 23. This order of controls, i.e., brake lever 11, grip 23, and shifting mechanism 14 can be placed in any permutation, and the gear controls 14 may be exchanged with other shifting mechanisms (e.g. thumb shifters, sliders, etc.). For example, the brake lever 11 can be mounted on either end of either gear control 14, and be rotated or oriented to accommodate user preference. The grip 23 may be included, may be removed, or may be positioned in an alternate location. In the example shown, each gear control or gear shifting mechanism 14 activates one of the derailleurs to control the position of the chain on one of the gear cassettes 21, 22. Alternatively, as will be evident to persons of ordinary skill in the art based on this disclosure, a single gear control or gear shifting mechanism may control both front and rear gear cassettes.

Figure 6:
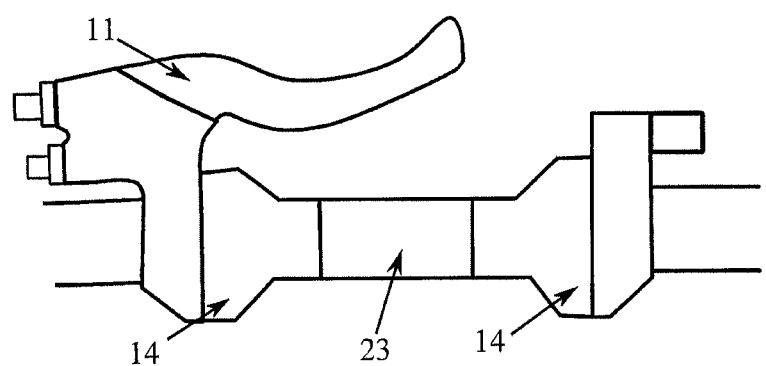
FIG. 6 is an enlarged view of the handlebar controls including the grip, gear shifters, and brake lever.
Figure 7:
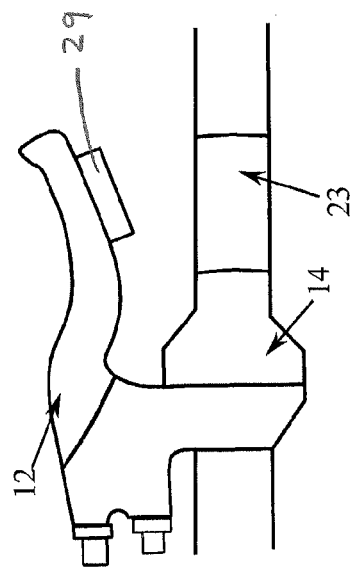
FIG. 7 is an enlarged view of another embodiment of the handlebar.
Figure 8:
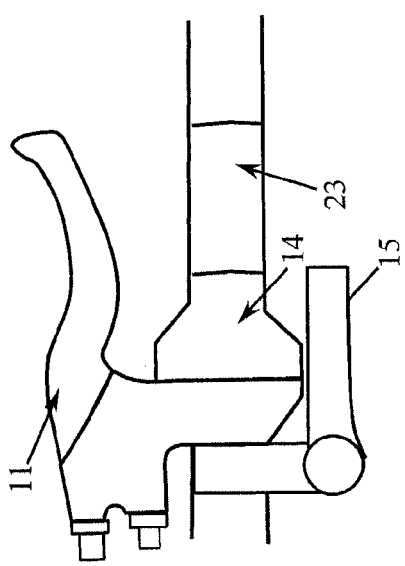
FIG. 8 is an enlarged view of another embodiment of the handlebar.
Figure 9:
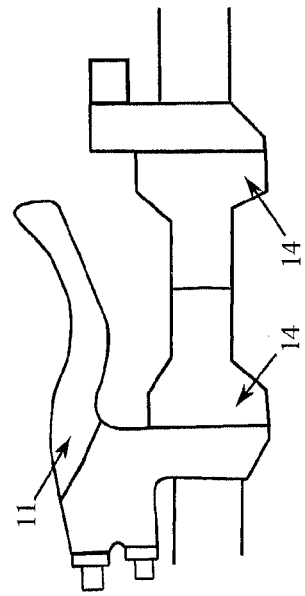
FIG. 9 is an enlarged view of yet another embodiment of the handlebar.
Figure 10:
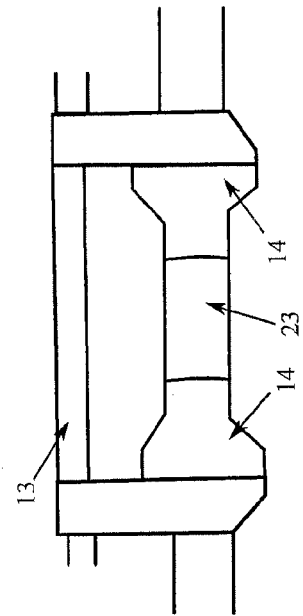
FIG. 10 is an enlarged view of an additional embodiment of the handlebar.
Figure 11:
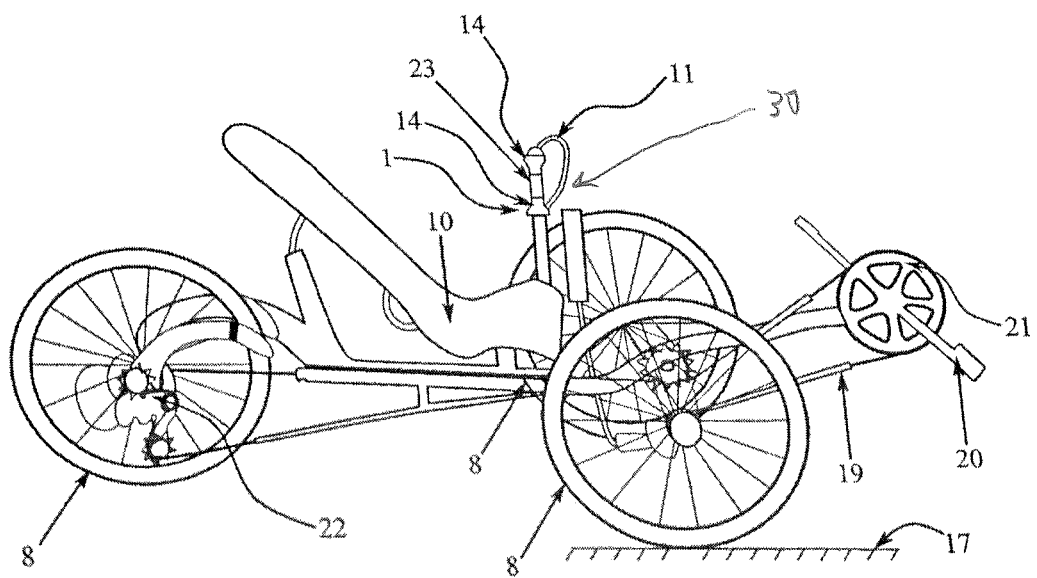
FIG. 11 is a perspective view of a tadpole style tricycle including an embodiment of the cycling control system.

Alternate orientations of these controls are illustrated in FIGS. 7, 8, 9, and 10. In FIG. 7 an orientation is depicted in which the right most gear shifter 14 is replaced by a gear shifter that is operated by the riders thumb depressing a small lever 15. In this figure the lever 15 is oriented opposite the brake lever 11. FIG. 8 depicts a scenario in which one of the gear shifters 14 operated by a twisting mechanism (as utilized in FIG. 6), has been replaced by a second lever 29 attached to the an alternate brake lever 12. This orientation could allow the rider to steer and shift gears while also gripping the brake lever 12. FIG. 9 depicts a novel brake lever 13 that extends across the entire grip 23 and is supported by two pieces perpendicular to the lever 13. The lever 13 is a linear bar parallel to the grip 23 that is operated by pulling the bar towards the grip 23. The lever 13 passes through slots on the supporting pieces, enabling depression of the lever 13 towards the grip 23. Both brake cables are affixed to the lever 13 such that depression of the lever 13 creates tension in the brake cables. Both brake cables may be mounted to the same side of the lever 13, or each may be mounted on opposite sides. FIG. 10 is yet another orientation in which the grip 23 is removed and the two gear shifters 14 are directly adjacent to one another. This may be the most practical orientation for use by children or anyone with hands small enough that it is no longer practical to operate both gear cassettes 21, 22 without having to move one's hand. FIGS. 5 and 11 depict yet another orientation in which these controls could have a similar orientation to any of the designs previously described, except that the grip 23 and controls are rotated ninety degrees so they are perpendicular to the riding surface 17. This configuration may be utilized to accommodate certain styles of bicycle, or to accommodate the preference of individual riders or populations of riders. All orientations described here are arbitrary examples of the multitude of configurations our design permits. Any of these orientations, or other orientations chosen to achieve the same purpose may be utilized on our control system in order to allow the functions described above: adjustability, comfort, and operations of steering, braking, and gear shifting.

Whether the handlebar is attached directly to the downstem 5, or attached to existing handlebars 3, it is attached such that it may rotate around a horizontal axis in two locations to adjust to the rider's preferred position, and be locked in place for safety. The handlebar can be adjusted by rotating at the handlebar hinge 2, rotating the junction between the downstem 5 and frame 18, and by sliding the seat 10 along the frame 18. Once locked in place, rotation around the axis of the downstem (axial rotation for steering) causes a similar angular displacement in the front wheel. This displacement may be amplified of reduced depending on the preference of the rider.

In FIG. 11, a "tadpole" tricycle is shown. A "tadpole" tricycle has a seat in front of a rear wheel, a pair of forward steering or front wheels and a pedal crank assembly at the front. The front wheel is turned not by rotating a handlebar, but instead by applying a torque to the front wheel. For example, the steering may be controlled by a vertical post 30 that is deflected (i.e., "push-pull") to steer the cycle. In the orientation depicted, the rider could control all functions of the bike using his left hand. The rider would control gear shifting and braking as described for other orientations, and he/she would control steering by either pushing or pulling on the handle. A pushing motion would result in a rightward turn, and a pulling motion would result in a leftward turn (or vice versa).

The two gear shifting mechanisms 14 may be replaced with a single device that controls both derailleurs. The rider interfaces with a single device to select the speed. This single control houses sub-mechanisms that control each derailleur independently. This configuration allows for the rider to select the speed with a single control, but maintains control of both gear cassettes.

While we have depicted a variety of control configurations, as well as multiple mechanisms for operating the steering and gear shifting mechanisms, it is to be understood that these controls, and mechanisms, as well as others not depicted may be combined, oriented, and/or exchanged in whatever manner is deemed most appropriate by the user in order to achieve the full functionality of the cycle with a single hand, while never having to remove that hand from the controls. The defining characteristic of this invention is a handle, either replacing or augmenting existing controls, that allows the user to comfortably and effectively utilize the cycles full range of functionality including, but not limited to, steering, braking, and gear shifting.

The present invention contemplates that many changes and modifications may be made. Therefore, while embodiments of the improved cycling control system have been shown and described, and a number of alternatives discussed, persons skilled in this art will readily appreciate that various additional changes and modifications may be made without departing from the spirit of the invention, as defined and differentiated by the following claims.

What is claimed is:

1. A cycle having at least two axles, the cycle comprising:
   a frame;
   a steering post journaled to the frame;
   a saddle affixed to the frame;
   a handlebar connected to the steering post, the handlebar having a control section within reach of a rider's hand, the handlebar having a cross member having a first end and a second end disposed opposite from the first end, the cross member disposed in spaced apart relation to the steering post;
   a first connecting member having a proximal end and a distal end, the proximal end of the first connecting member disposed adjacent to the first end of the cross member, the first connecting member extending from the first end of the cross member inward toward the steering post, the first connecting member disposed at an acute angle relative to the cross member;
   a second connecting member having a proximal end and a distal end, the proximal end of the second connecting member disposed adjacent to the second end of the cross member, the second connecting member extending from the second end of the cross member inward toward the steering post, the second connecting member disposed at an acute angle relative to the cross member, the first and second connecting members having distal ends disposed adjacent to the steering post, the distal ends of the first and second connecting members being disposed adjacent to each other such that the cross member and the first and second connecting members form a substantially triangular shape, the control section disposed on the cross member;
   at least one brake lever and at least two gear shifting mechanisms mounted adjacent to each other in the control section such that when one of the rider's hands grips the handlebar in the control section, both gear shifting mechanisms and the brake lever can be reached and operated by the same hand.

2. The cycle of claim 1, wherein the brake lever is connected to front and rear brakes.

3. The cycle of claim 1, wherein a grip is disposed between the two gear shifting mechanisms.

4. The cycle of claim 1, wherein the control section is above the rider's lap.

5. The cycle of claim 1, wherein the control section is a part of a handlebar shaped in a loop.

6. The cycle of claim 1, wherein one of the axles comprises a rear axle with two wheels journaled thereon.

7. A handlebar mountable to a steering post, the handlebar comprising:
   a cross member having a first end and a second end disposed opposite from the first end, the cross member disposed in spaced apart relation to the steering post;
   a first connecting member having a proximal end and a distal end, the proximal end of the first connecting member disposed adjacent to the first end of the cross member, the first connecting member extending from the first end of the cross member inward toward the steering post, the first connecting member disposed at an acute angle relative to the cross member;
   a second connecting member having a proximal end and a distal end, the proximal end of the second connecting member disposed adjacent to the second end of the cross member, the second connecting member extending from the second end of the cross member inward toward the steering post, the second connecting member disposed at an acute angle relative to the cross member, the first and second connecting members having distal ends disposed adjacent to the steering post, the distal ends of the first and second connecting members being disposed adjacent to each other such that the cross member and the first and second connecting members form a substantially triangular shape, the control section disposed on the cross member;

a control section of the handlebar having a brake lever and at least two gear shifting mechanisms mounted adjacent to each other such that when one of the rider's hands grips the handlebar in the control section, both gear shifting mechanisms and the brake lever can be reached and operated by the same hand.

8. The handlebar of claim 7, wherein the handlebar is fixed to an existing handlebar.

9. A cycling control system, comprising:

a brake lever disposed on a control section of a handlebar, the handlebar having a cross member having a first end and a second end disposed opposite from the first end, the cross member disposed in spaced apart relation to the steering post;

a first connecting member having a proximal end and a distal end, the proximal end of the first connecting member disposed adjacent to the first end of the cross member, the first connecting member extending from the first end of the cross member inward toward the steering post, the first connecting member disposed at an acute angle relative to the cross member;

a second connecting member having a proximal end and a distal end, the proximal end of the second connecting member disposed adjacent to the second end of the cross member, the second connecting member extending from the second end of the cross member inward toward the steering post, the second connecting member disposed at an acute angle relative to the cross member, the first and second connecting members having distal ends disposed adjacent to the steering post, the distal ends of the first and second connecting members being disposed adjacent to each other such that the cross member and the first and second connecting members form a substantially triangular shape, the control section disposed on the cross member;

at least two gear shifting mechanisms mounted on the control section; and, a steering post connected to the handlebar; wherein when the rider's hand is in contact with the control section, the at least two gear shifting mechanisms and the brake lever can be reached and operated by the rider's hand without removing the hand from contact with the handlebar.

10. The cycling control system of claim 9, further comprising a grip disposed adjacent to the gear shifting mechanisms and the brake lever.

11. The cycling control system of claim 9, wherein the brake lever controls both front and rear braking mechanisms.

12. The cycling control system of claim 9, wherein the control section is mounted to an existing handlebar.

* * * * *